(12) United States Patent
Chen et al.

(10) Patent No.: US 12,362,559 B2
(45) Date of Patent: Jul. 15, 2025

(54) EMBEDDED POWER SUPPLY APPARATUS AND POWER SUPPLY SYSTEM

(71) Applicant: DELTA ELECTRONICS, INC., Taoyuan (TW)

(72) Inventors: Yu-Jen Chen, Taoyuan (TW); Chih-Yen Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 233 days.

(21) Appl. No.: 17/456,559

(22) Filed: Nov. 24, 2021

(65) Prior Publication Data
US 2023/0057095 A1 Feb. 23, 2023

(30) Foreign Application Priority Data
Aug. 18, 2021 (TW) ................... 110130518

(51) Int. Cl.
*H02J 1/08* (2006.01)

(52) U.S. Cl.
CPC ............ *H02J 1/08* (2013.01); *H02J 1/082* (2020.01); *H02J 2310/12* (2020.01); *H02J 2310/14* (2020.01); *H02J 2310/50* (2020.01); *H02J 2310/54* (2020.01)

(58) Field of Classification Search
CPC .............. H02J 2310/50; H02J 2310/14; H02J 2310/58; H02J 2310/12; H02J 1/08; H02J 3/003; H02J 3/02; H02J 1/082
See application file for complete search history.

(56) References Cited

U.S. PATENT DOCUMENTS

| | | | |
|---|---|---|---|
| 2014/0042814 A1* | 2/2014 | Kather | H02J 1/14 307/59 |
| 2014/0052503 A1* | 2/2014 | Zaloom | H02J 13/00002 705/7.39 |
| 2017/0026916 A1* | 1/2017 | Velu | H04W 52/283 |
| 2017/0077698 A1* | 3/2017 | Liu | H02J 7/0029 |
| 2018/0210525 A1 | 7/2018 | Luo et al. | |

(Continued)

FOREIGN PATENT DOCUMENTS

| | | |
|---|---|---|
| CN | 107608438 A | 1/2018 |
| TW | 201125255 A1 | 7/2011 |

(Continued)

*Primary Examiner* — Harry R Behm
(74) *Attorney, Agent, or Firm* — CKC & Partners Co., LLC

(57) ABSTRACT

An embedded power supply apparatus is partially buried in an enclosed structure, is configured to provide a first DC voltage to a plurality of electronic devices, and includes a first power conversion circuit, a plurality of switch circuits, a human-machine interface module and a control circuit. The first power conversion circuit is configured to convert an input AC voltage into the first DC voltage and provide the first DC voltage to the switch circuits. The switch circuits each is configured to selectively transmit the first DC voltage to a corresponding electronic device of the electronic devices according to a corresponding first control signal of a plurality of first control signals. The control circuit is configured to receive a second control signal generated by the human-machine interface module, and generate the first control signals to the switch circuits according to the second control signal.

11 Claims, 5 Drawing Sheets

(56) References Cited

U.S. PATENT DOCUMENTS

| | | | |
|---|---|---|---|
| 2019/0149761 A1* | 5/2019 | Cai | G09G 3/3208 |
| | | | 348/730 |
| 2019/0181690 A1* | 6/2019 | Haartsen | H02J 13/00026 |
| 2021/0083506 A1* | 3/2021 | Rao | H02H 7/261 |
| 2021/0328427 A1* | 10/2021 | Izumi | H02J 3/381 |

FOREIGN PATENT DOCUMENTS

| | | | | |
|---|---|---|---|---|
| TW | 201426675 A | 7/2014 | | |
| TW | 201543799 A | 11/2015 | | |
| TW | 201610660 A | 3/2016 | | |
| TW | 201712465 A | 4/2017 | | |
| WO | WO-2020105359 A1 * | 5/2020 | | H02J 1/08 |

\* cited by examiner

EMBEDDED POWER SUPPLY APPARATUS AND POWER SUPPLY SYSTEM

CROSS-REFERENCE TO RELATED APPLICATION

This application claims priority to Taiwan Application Serial Number 110130518, filed Aug. 18, 2021, which is herein incorporated by reference in its entirety.

BACKGROUND

Field of Invention

This disclosure relates to a power supply system, and in particular to a power supply system applying an embedded power supply apparatus.

Description of Related Art

Current electric products would consume electric energy when connecting to electric power, even though they are not used or activated (for example, plug of the electric product is inserted into plug seat). Therefore, unnecessary energy waste is often caused.

Current electric products usually require custom power supplies to convert AC voltage into appropriate DC voltage. If a number of AC-DC power supplies are arranged in an indoor environment, the problems of electrical fire, electric shock and electromagnetic interference (EMI) easily happen. In addition, if electric products are designed to be capable of performing AC-DC conversion, the electric products would often have problems of large volume, large weight, high operating temperature, low energy conversion efficiency and high production cost.

SUMMARY

An aspect of present disclosure relates to an embedded power supply apparatus. The embedded power supply apparatus is partially buried in an enclosed structure, is configured to provide a first DC voltage to a plurality of electronic devices, and includes a first power conversion circuit, a plurality of switch circuits, a human-machine interface module and a control circuit. The first power conversion circuit is configured to convert an input AC voltage into the first DC voltage, to provide the first DC voltage. The switch circuits are coupled between the first power conversion circuit and the electronic devices, and each is configured to selectively transmit the first DC voltage to a corresponding electronic device of the electronic devices according to a corresponding first control signal of a plurality of first control signals. The human-machine interface module is configured to generate a second control signal in response to received information. The control circuit is configured to receive the second control signal, and is configured to generate the first control signals to the switch circuits according to the second control signal.

Another aspect of present disclosure relates to a power supply system. The power supply system includes an embedded power supply apparatus and a plurality of electronic devices. The embedded power supply apparatus is partially buried in an enclosed structure, includes a first power conversion circuit, a plurality of switch circuits, a human-machine interface module and a control circuit, and is coupled to the electronic devices. The first power conversion circuit is configured to convert an input AC voltage into a first DC voltage, to provide the first DC voltage to the electronic devices. The switch circuits are coupled between the first power conversion circuit and the electronic devices, and each is configured to selectively transmit the first DC voltage to a corresponding electronic device of the electronic devices according to a corresponding first control signal of a plurality of first control signals. The human-machine interface module is configured to generate a second control signal in response to received information. The control circuit is configured to receive the second control signal, and is configured to generate the first control signals to the switch circuits according to the second control signal. The electronic devices each includes a second power conversion circuit, wherein the second power conversion circuit is configured to receive the first DC voltage and convert the first DC voltage into a second DC voltage.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
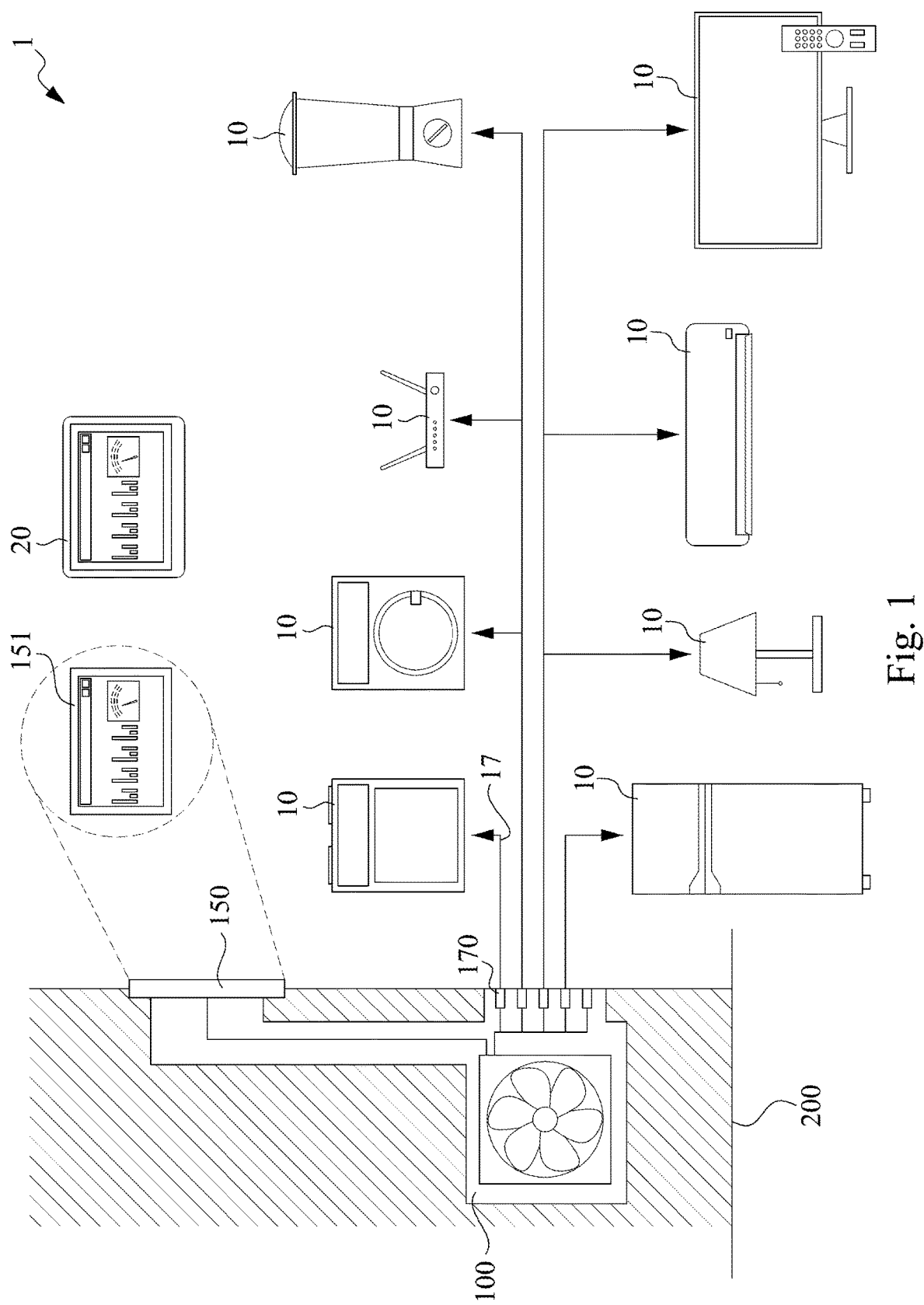
FIG. 1 is a schematic diagram of a power supply system in accordance with some embodiments of the present disclosure.
Figure 2:
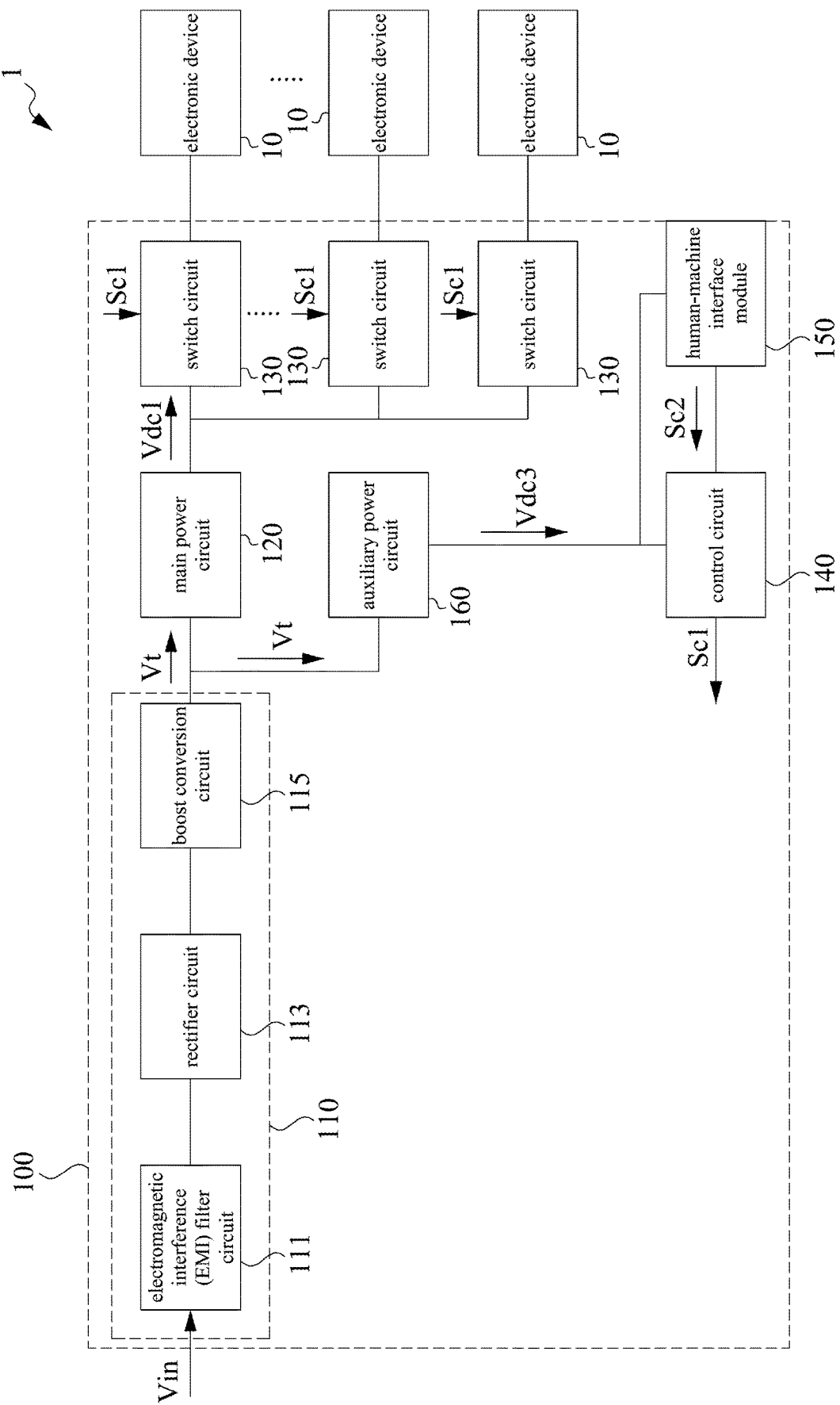
FIG. 2 is a block diagram of the power supply system in accordance with some embodiments of the present disclosure.

Referring to FIG. 1, FIG. 1 depicts a power supply system 1 in accordance with some embodiments of the present disclosure. The power supply system 1 includes an embedded power supply apparatus 100 and a number of electronic devices 10. In particular, the power supply apparatus 100 is configured to receive an input voltage Vin (as shown in FIG. 2, which will be described later) and is configured to convert the input voltage Vin into a first DC (direct current) voltage Vdc1 (as shown in FIG. 2, which will be described later), to selectively provide the first DC voltage Vdc1 to any electronic device coupled to the power supply apparatus 100.

As shown in FIG. 1, the power supply apparatus 100 is at least partially buried in an enclosed structure 200. The enclosed structure 200 can be, for example but not limited to, a wall or a transformer box. The enclosed structure 200 can provide the input voltage Vin. For example, when the enclosed structure 200 is the wall, the input voltage Vin can practically be AC (alternating current) voltage provided by main electric supply.

In addition, the power supply apparatus 100 includes a human-machine interface module 150 and at least one plug seat 170, wherein the human-machine interface module 150 and the plug seat 170 are exposed from the enclosed structure 200. For example, the human-machine interface module 150 can include a display panel 151. The display panel 151 is exposed from the enclosed structure 200, can display device information (e.g., operating status (including usage time, temperature, and power consumption), operating schedule, basic information, etc.) related to the electronic devices 10 and can allow the user to operate in, for example but not limited to, a touching manner to control the electronic devices 10 (for example, turn off or on the electronic devices 10).

In some embodiments, the human-machine interface module 150 can further be coupled to a mobile device 20 (as shown in FIG. 1, e.g., smartphone, tablet, etc.) carried by the user in, for example but not limited to, a wireless manner. In such way, the user can see the device information related to the electronic devices 10 in anytime by the mobile device 20 and can further control the electronic devices 10 by operating the mobile device 20.

In some embodiments, the electronic devices 10 each can include a connecting cable 17 (as shown in FIG. 1), wherein one end of the connecting cable 17 is electrically connected to the electronic device 10, and the other end of the connecting cable 17 is provided with a connecting terminal (not shown, e.g., plug). In such way, the electronic device 10 can receive the first DC voltage Vdc1 generated by the power supply apparatus 100 by inserting the connecting terminal of the connecting cable 17 into the plug seat 170. In some embodiments, the electronic device 10 can be an appliance as shown in FIG. 1, e.g., oven, washer, router, fruit blender, refrigerator, table lamp, air conditioner, television, etc. However, the present disclosure is not limited herein. The structure of the electronic device 10 would be described in detail below with reference to FIG. 4.

Referring to FIG. 2, FIG. 2 is a block diagram of the power supply system 1 in accordance with some embodiments of the present disclosure. As shown in FIG. 2, besides the human-machine interface module 150 and the plug seat 170 (only shown in FIG. 1) of FIG. 1, the power supply apparatus 100 further includes a first power conversion circuit, a number of switch circuits 130 and a control circuit 140. The first power conversion circuit includes a pre-stage conversion circuit 110, a main power circuit 120 and an auxiliary power circuit 160. The pre-stage conversion circuit 110 includes an electromagnetic interference (EMI) filter circuit 111, a rectifier circuit 113 and a boost conversion circuit 115.

In structure, the rectifier circuit 113 is coupled between the EMI filter circuit 111 and the boost conversion circuit 115. The main power circuit 120 is coupled between the pre-stage conversion circuit 110 and the switch circuits 130. The switch circuits 130 each is coupled to the corresponding electronic device 10 through the plug seat 170 and the connecting cable 17. One end of the auxiliary power circuit 160 is coupled between the pre-stage conversion circuit 110 and the main power circuit 120, and the other end of the auxiliary power circuit 160 is coupled to the control circuit 140 and the human-machine interface module 150. The control circuit 140 and the human-machine interface module 150 are coupled to each other. The human-machine interface module 150 is coupled to the electronic devices 10 in, for example but not limited to, a wireless manner to receive the device information of each electronic device 10 and to display the received device information on the display panel 151 as shown in FIG. 1.

Figure 3:
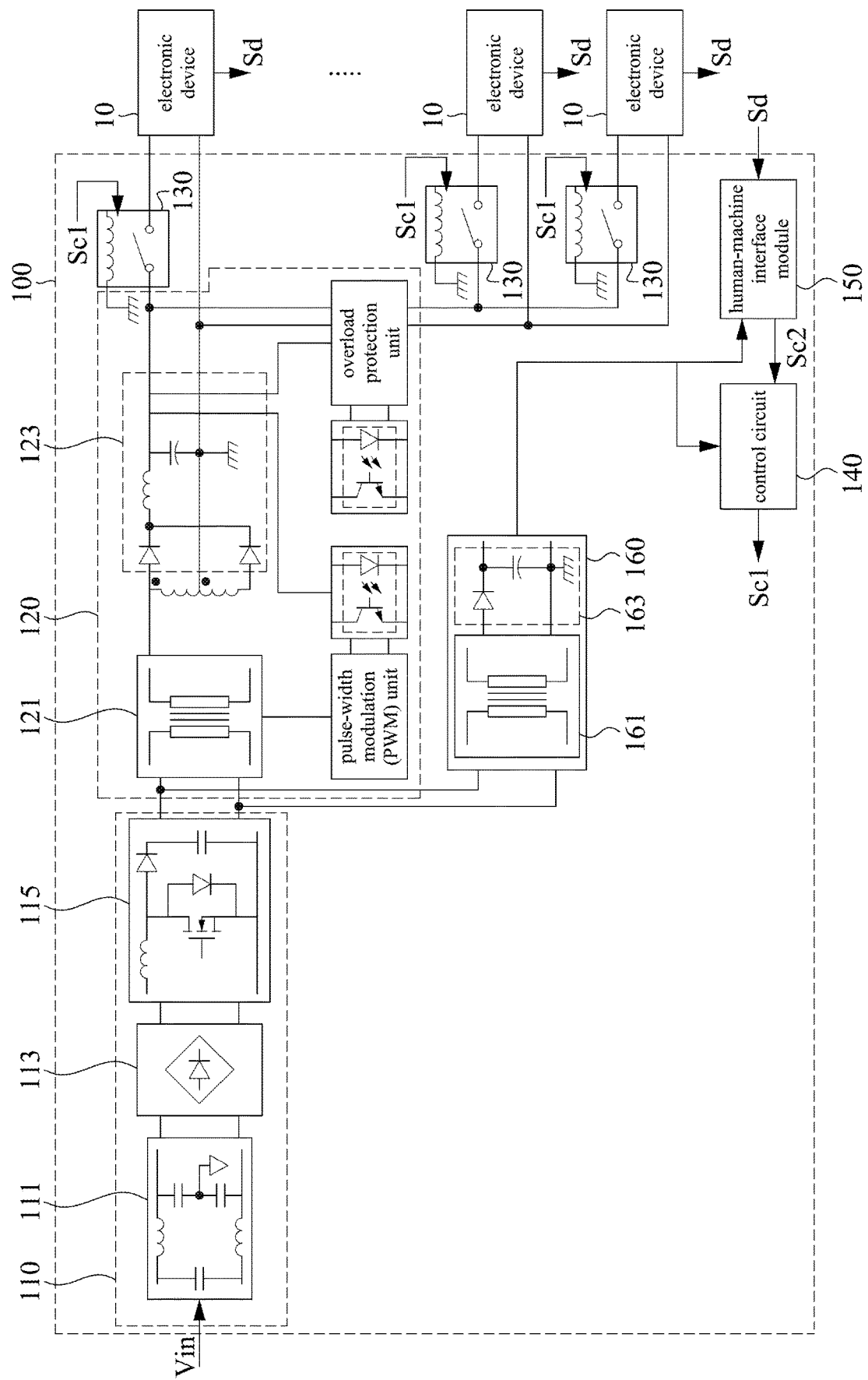
FIG. 3 is a circuit diagram of the power supply system in accordance with some embodiments of the present disclosure.

Referring to FIG. 3, FIG. 3 is a circuit diagram of the power supply system 1 in accordance with some embodiments of the present disclosure. In some embodiments, the EMI filter circuit 111 can be implemented by a number of passive components, such as two inductors and three capacitors in FIG. 3. The rectifier circuit 113 can be, for example but not limited to, a rectifier bridge. The boost conversion circuit 115 can be implemented by an inductor, a switch (e.g., transistor), a diode and a capacitor in FIG. 3.

The main power circuit 120 includes a first transformer 121 and a first rectifying and filtering circuit 123. The first rectifying and filtering circuit 123 can be implemented by a center-tapped full-wave rectifier circuit and a low-pass filter circuit (e.g., an inductor and a capacitor in FIG. 3). The auxiliary power circuit 160 includes a second transformer 161 and a second rectifying and filtering circuit 163. The second rectifying and filtering circuit 163 can be implemented by a half-wave rectifier circuit and a low-pass filter circuit (e.g., a capacitor in FIG. 3). The switch circuits 130 each can be implemented by, for example but not limited to, a transistor (e.g., MOS (metal oxide semiconductor)). The control circuit 140 can be implemented by one or more central processing unit (CPU), application-specific integrated circuit (ASIC), microprocessor or system on a Chip (SoC).

Figure 4:
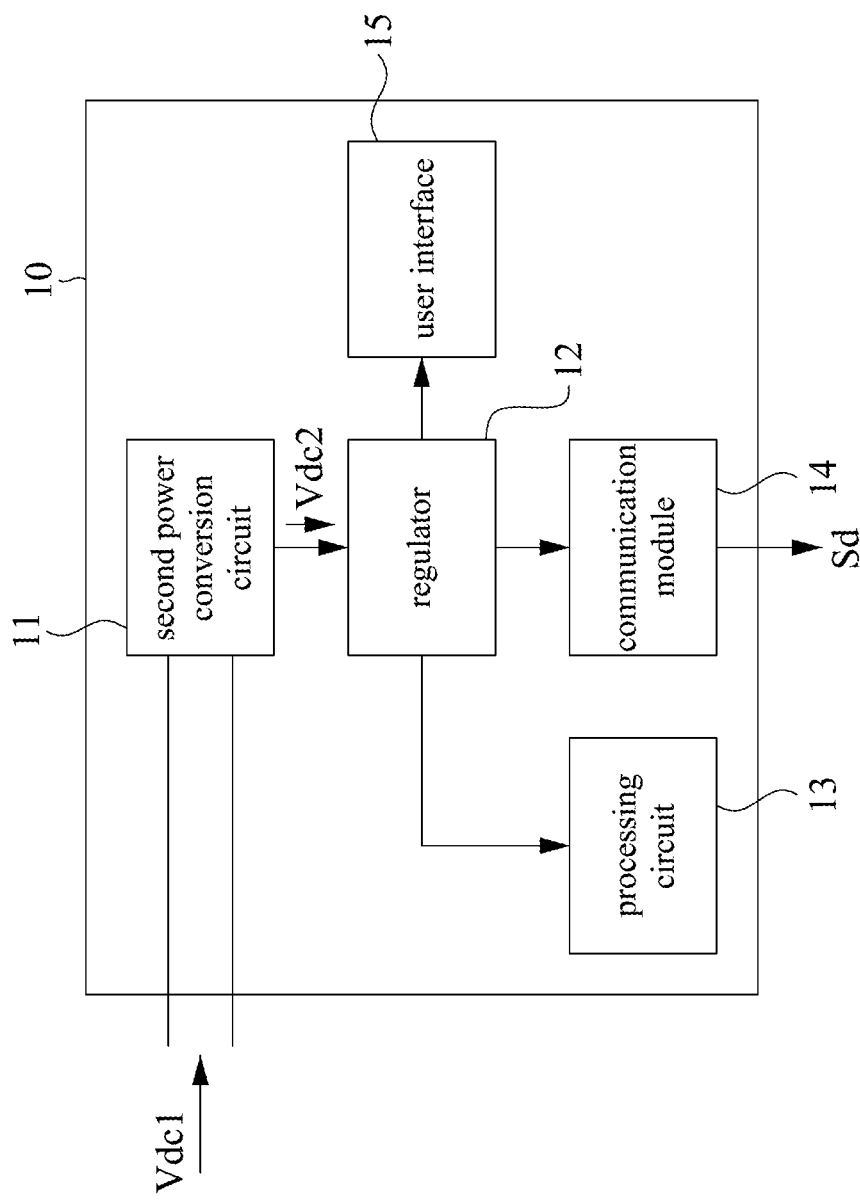
FIG. 4 is a block diagram of an electronic device in accordance with some embodiments of the present disclosure.

Referring to FIG. 4, FIG. 4 depicts a structure of the electronic device 10 in accordance with some embodiments of the present disclosure. Each of the electronic devices 10 can includes a second power conversion circuit 11, a regulator 12, a processing circuit 13, a communication module 14 and a user interface 15. The second power conversion circuit 11 is coupled to the corresponding switch circuit 130 (as shown in FIG. 3), and the regulator 12 is coupled to the second power conversion circuit 11. The processing circuit 13, the communication module 14 and the user interface 15 are all coupled to the regulator 12, to receive appropriate supply voltage. It can be appreciated that the processing circuit 13 is further coupled to the communication module 14 and the user interface 15 to control the communication module 14 and the user interface 15, although these are not shown in FIG. 3.

For better understanding the present application, the operation of the power supply system 1 would be described in detail below with reference to FIGS. 1, 2, 3 and 4. During operating period of the power supply apparatus 100, the input voltage Vin is provided to the power supply apparatus 100. As shown in FIG. 2, the pre-stage conversion circuit 110 of the power supply apparatus 100 receives the input voltage Vin and converts the input voltage Vin into a transient voltage Vt. During operation of the pre-stage conversion circuit 110, the EMI filter circuit 111 first filters electromagnetic noise of the input voltage Vin, the rectifier circuit 113 performs a rectification on the voltage outputted by the EMI filter circuit 111, and the boost conversion circuit 115 performs a voltage boost process (for example, by alternatively turning on and off the switch of the boost conversion circuit 115, the voltage outputted by the rectifier circuit 113 is increased) on the voltage outputted by the rectifier circuit 113, to generate the transient voltage Vt.

As shown in FIG. 2, the main power circuit 120 then receives the transient voltage Vt and converts the transient voltage Vt into the first DC voltage Vdc1, to transmit the first DC voltage Vdc1 to each of the switch circuits 130. As shown in FIG. 3, in some embodiments, the first transformer 121 includes a first primary winding and a first secondary winding, the first primary winding is coupled to the pre-stage conversion circuit 110, and the first secondary winding is coupled to the first rectifying and filtering circuit 123. Referring to FIGS. 2 and 3, during operation of the main power circuit 120, the first primary winding of the first transformer 121 receives the transient voltage Vt of FIG. 2, and the first secondary winding of the first transformer 121 outputs a first induced voltage (not shown) by an electromagnetic induction with the first primary winding. The first rectifying and filtering circuit 123 performs a rectifying and filtering process on the first induced voltage, so that the first induced voltage is converted into the first DC voltage Vdc1 of FIG. 2.

As shown in FIG. 2, the switch circuits 130 each receives the first DC voltage Vdc1 and is selectively conducted according to a corresponding first control signal Sc1. If the switch circuit 130 is conducted, the first DC voltage Vdc1 may be transmitted to the electronic device 10 through the switch circuit 130. If the switch circuit 130 is cut off or blocked, the first DC voltage Vdc1 is unable to be transmitted to the electronic device 10. In some embodiments, the switch circuit 120 is conducted according to the first control signal Sc1 with a high voltage level and is cut off according to the first control signal Sc1 with a low voltage level. In other embodiments, the switch circuit 120 is conducted according to the first control signal Sc1 with the low voltage level and is cut off according to the first control signal Sc1 with the high voltage level.

As shown in FIG. 4, when the first DC voltage Vdc1 is transmitted to the electronic device 10 through the switch circuit 130, the second power conversion circuit 11 of the electronic device 10 would convert the received first DC voltage Vdc1 into a second DC voltage Vdc2. In some embodiments, the second power conversion circuit 11 can be implemented by a transformer and a rectifying and filtering circuit. The regulator 12 then receives the second DC voltage Vdc2, to power the processing circuit 13, the communication module 14 and the user interface 15 by the second DC voltage Vdc2. It can be appreciated that since different electronic devices 10 may require different supply voltages, each electronic device 10 may practically convert the first DC voltage Vdc1 into the required supply voltage by the second power conversion circuit 11. In other words, the second DV voltages Vdc2 generated by the electronic devices 10 may be different from each other.

In some embodiments, the user controls the electronic device 10 through the user interface 15 on the electronic device 10. For example, the user can manually turn on or off the electronic device 10, or can schedule the electronic device 10, so that the electronic device 10 can be automatically turned on or off according to the scheduled time arranged by the user. It can further be appreciated that the electronic device 10 which receives the first DC voltage Vdc1 is not necessarily activated. In some practical applications, the electronic device 10 receives the first DC voltage Vdc1, but the user does not turn on the electronic device 10. At this time, although being powered, the processing circuit 13, the communication module 14 and the user interface 15 of the electronic device 10 are in an idle or sleep state, so that the power consumption can be reduced, and the electronic device 10 can be awakened at any time in response to operation of the user.

Referring to FIG. 2 again, the auxiliary power circuit 160 also receives the transient voltage Vt and converts the transient voltage Vt into a third DC voltage Vdc3, to provide the third DC voltage Vdc3 to the control circuit 140 and the human-machine interface module 150. As shown in FIG. 3 again, in some embodiments, the second transformer 161 includes a second primary winding and a second secondary winding, the second primary winding is coupled to the pre-stage conversion circuit 110, and the second secondary winding is coupled to the second rectifying and filtering circuit 163. Referring to FIGS. 2 and 3, during operation of the auxiliary power circuit 160, the second primary winding of the second transformer 161 receives the transient voltage Vt of FIG. 2, and the second secondary winding of the second transformer 161 outputs a second induced voltage (not shown) by an electromagnetic induction with the second primary winding. The second rectifying and filtering circuit 163 performs a rectifying and filtering process on the second induced voltage, so that the second induced voltage is converted into the third DC voltage Vdc3 of FIG. 2.

As shown in FIGS. 3 and 4, in some embodiments, processing circuit 13 of the electronic device 10 generates a device signal Sd and transmits the device signal Sd to the human-machine interface module 150 by the communication module 15 in a wireless manner, wherein the device signal Sd may carry device information related to the electronic device 10. In such way, the human-machine interface module 150 generates a second control signal Sc2 to the control circuit 140 according to the device information in the device signal Sd. Accordingly, the control circuit 140 generates the first control signal Sc1 to the switch circuit 130 according to the second control signal Sc2, to conduct or cut off the switch circuit 130.

In some practical applications, as shown in FIG. 3, three switch circuits 130 are all conducted. The electronic device 10 on the top of FIG. 3 is not activated (i.e., is turned off) currently, and two of the other electronic devices 10 are both activated (i.e., are turned on) currently. At this time, the human-machine interface module 150 of the power supply apparatus 100 receives three device signals Sd outputted by the three electronic devices 10. Since the electronic device 10 on the top of FIG. 3 is turned off currently, the power consumption thereof would lower than two activated electronic devices 10. Accordingly, the human-machine interface module 150 determines that the power consumption of the electronic device 10 on the top of FIG. 3 is lower or equal to a predetermined value according to the device information carried by each of the three device signals Sd, to decide to stop powering the electronic device 10 on the top of FIG. 3. The human-machine interface module 150 then generates the second control signal Sc2 to the control circuit 140, so that the control circuit 140 generates the first control signal Sc1 to the switch circuit 130 on the top of FIG. 3 according to the second control signal Sc2. The switch circuit 130 on the top of FIG. 3 is then switched to being cut off according to the first control signal Sc1, to stop providing the first DC voltage Vdc1 to the electronic device 10 on the top of FIG. 3. In such way, the power consumption of the unused electronic device 10 would be reduced to a minimum (e.g., the power consumption is reduced to 0).

In other embodiments, the human-machine interface module 150 obtains the operating schedule of the electronic device 10 according to the device information carried by the device signal Sd. Accordingly, the human-machine interface module 150 generates the second control signal Sc2 to the control circuit 140, so that the control circuit 140 generates the first control signal Sc1 to the switch circuit 130 at the scheduled time (including a turn-on time of the electronic device 10 and a turn-off time of the electronic device 10). That is to say, the power supply apparatus 100 may automatically provide the first DC voltage Vdc1 to the electronic device 10 when the electronic device 10 should be turned on and may automatically stop providing the first DC voltage Vdc1 to the electronic device 10 when the electronic device 10 should be turned off, so as to decrease the energy waste.

In other embodiments, the user obtains that one or more electronic devices 10 in a building are powered but not activated according to the device information of each electronic device 10 displayed by the human-machine interface module 150 of the power supply apparatus 100 (or the device information of each electronic device 10 displayed by the mobile device 20 of FIG. 1). At this time, the user may operate the human-machine interface module 150 (or the mobile device 20 of FIG. 1) to stop powering the inactivated one or more electronic devices 10. The human-machine interface module 150 generates the second control signal Sc2 to the control circuit 140 according to the operation (i.e., the user input) of the user on the human-machine interface module 150 (or the mobile device 20 of FIG. 1). Accordingly, the control circuit 140 generates one or more first control signals Sc1 to one or more switch circuits 130 corresponding to the inactivated one or more electronic devices 10, so that the one or more switch circuits 130 are cut off or blocked.

In other embodiments, since the user interface 15 of the electronic device 10 without receiving the first DC voltage Vdc1 may not operate normally, the user cannot turn on the electronic device 10 without receiving the first DC voltage Vdc1 by operating the user interface 15. At this time, the user may operate the human-machine interface module 150 (or the mobile device 20 of FIG. 1) to power the electronic device 10, so as to turn on the electronic device 10.

Figure 5:
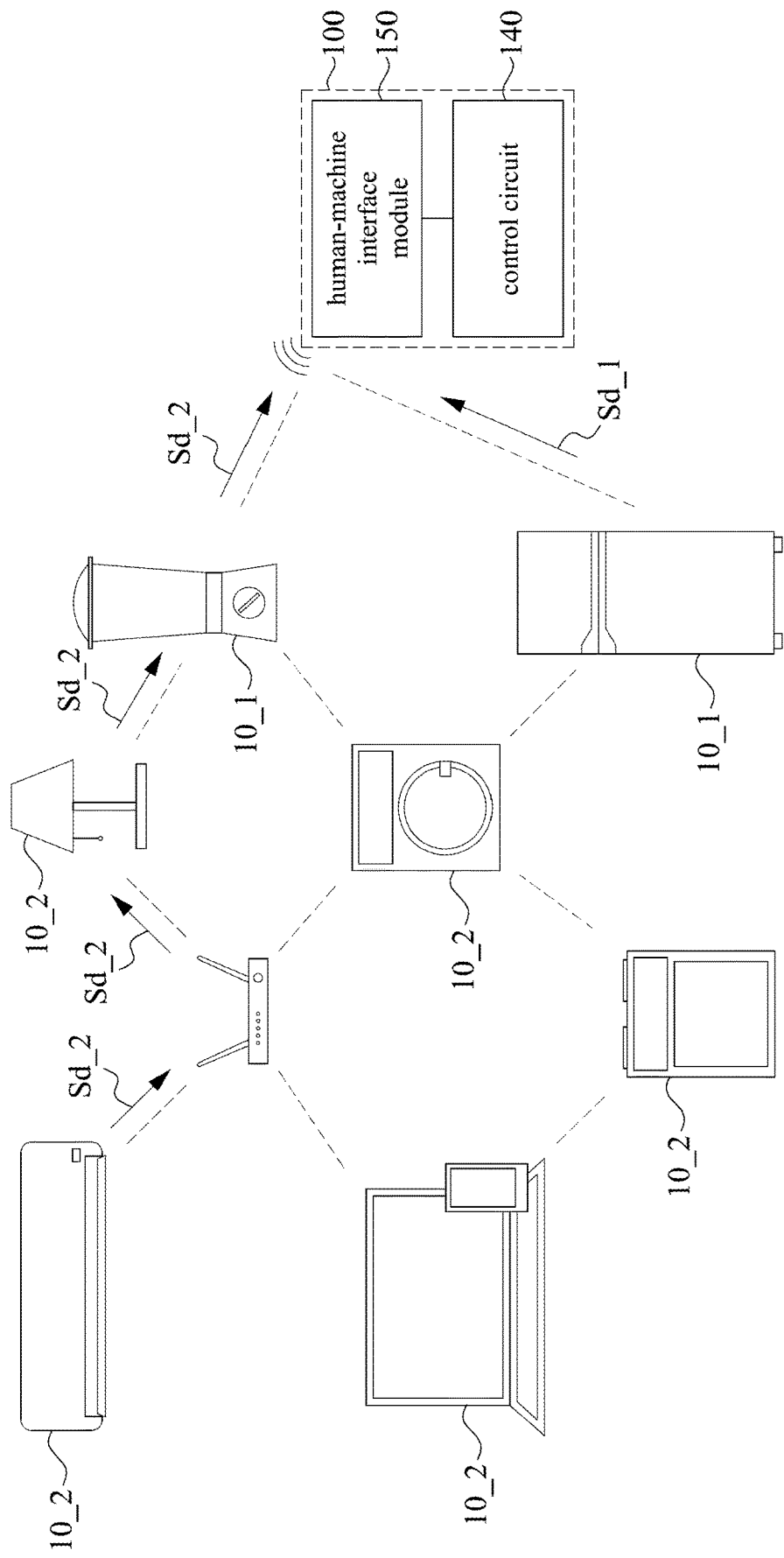
FIG. 5 is a schematic diagram of a wireless communication performed between a number of electronic devices and an embedded power supply apparatus in accordance with some embodiments of the present disclosure.

Referring to FIG. 5, FIG. 5 is a schematic diagram of the wireless communication performed between the electronic devices 10 and the power supply apparatus 100 in accordance with some embodiments of the present disclosure. The electronic devices 10 of FIG. 5 include a number of first electronic devices 10_1 and a number of second electronic devices 10_2. It can be appreciated that using the first electronic devices 10_1 and the second electronic devices 10_2 for description herein are only for convenience of understanding, the first electronic devices 10_1 and the second electronic devices 10_2 can be implemented by the electronic device 10 of FIG. 4. It can further be appreciated that FIG. 5 only shows the human-machine interface module 150 and the control circuit 140 in the power supply apparatus 100 for simplifying description.

In some embodiments, the first communication module (not shown) of each first electronic device 10_1 and the second communication module (not shown) of each second electronic device 10_2 are both implemented by the short-haul and low power communication technology (for example but not limited to, ZigBee technology). In such way, the first electronic device 10_1 at lower right of FIG. 5 (i.e., the refrigerator in FIG. 5) may transmit a first device signal Sd_1 to the human-machine interface module 150 by the first communication module. In addition, the second electronic device 10_2 at upper left of FIG. 5 (i.e., the air conditioner in FIG. 5) may emit a second device signal Sd_2 by the second communication module and may transmit the second device signal Sd_2 to the human-machine interface module 150 via the two second communication modules of the two second electronic devices 10_2 at upper middle of FIG. 5 (i.e., the router and the table lamp in FIG. 5) and the first communication module of the first electronic device 10_1 at upper right of FIG. 5 (i.e., the fruit blender in FIG. 5). In other words, the electronic devices of the power supply system of the present disclosure may establish a wireless communication network (as shown in FIG. 5) between the electronic devices by the communication modules, so as to transmit at least one device signal to the human-machine interface module 150.

By the wireless communication technology as shown in FIG. 5, even if there are the electronic devices 10 (for example, at third floor of the building) in the building away from the power supply apparatus 100 (for example, at first floor of the building), the electronic devices 10 away from the power supply apparatus 100 can transmit the device information to the power supply apparatus 100 through at least one electronic device 10 (for example, at second floor of the building) near the power supply apparatus 100. In such way, the user is capable of monitoring and managing all of the electronic devices in the building through the power supply apparatus 100.

In sum, the present disclosure provides the embedded power supply apparatus 100 and the power supply system 1 applicable thereto. Because the power supply apparatus 100 is at least partially buried in the enclosed structure 200, the power supply apparatus 100 may dramatically decrease the problems of electrical fire, electric shock, electromagnetic interference (EMI) and man-made appearance damage or apparatus failure. Accordingly, it can be flexibly designed to be compliant with safety requirements, so as to reduce the production cost of the power supply apparatus 100. Because each of the electronic devices 10 connected to the power supply apparatus 100 receives the same first DC voltage Vdc1 and then converts the first DC voltage Vdc1 into the required second DC voltage, the volume and weight of the electronic devices, which require to be powered with large current and low voltage, are dramatically decreased (for example, the connecting cable is decreased in cable diameter). In addition, the power supply system 1 manages and monitors energy supplied to each of the electronic devices 10 by the short-haul and low power communication technology between the human-machine interface module 150 and the electronic devices 10, so as to save energy.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A power supply system, comprising:
an embedded power supply apparatus at least partially buried in an enclosed structure, comprising a first power conversion circuit, a plurality of switch circuits, a human-machine interface module and a control circuit, and coupled to a plurality of electronic devices, wherein, the first power conversion circuit is configured to convert an input AC voltage into a first DC voltage and provide the first DC voltage to the switch circuits, the switch circuits are coupled between the first power conversion circuit and the electronic devices, and each switch circuit is configured to selectively transmit the first DC voltage to a corresponding one of the electronic devices according to a corresponding first control signal of a plurality of first control signals, the human-machine interface module is configured to generate a second control signal in response to received information, the control circuit is configured to receive the second control signal and generate the first control signals to the switch circuits according to the second control signal; and the plurality of electronic devices each comprising a second power conversion circuit and a communication module, wherein the second power conversion circuit is configured to receive the first DC voltage and convert the first DC voltage into a second DC voltage, wherein the electronic devices comprise a first electronic device and a second electronic device, and when the first electronic device and the second electronic device are different in type, the first electronic device and the second electronic device are configured to transfer the same first DC voltages into the different second DC voltages, respectively;

wherein the received information comprises at least one device signal outputted by the electronic devices, and the human-machine interface module is configured to receive the at least one device signal to obtain an operating schedule of the electronic devices, so that the control circuit generates the first control signals according to the operating schedule of the electronic devices to control the switch circuits, wherein the communication module of the first electronic device emits a first device signal of the at least one device signal by a ZigBee technology, the communication module of the second electronic device transmits the first device signal to the human-machine interface module by the ZigBee technology, and the human-machine interface module obtains device information of the first electronic device from the first device signal, and wherein the human-machine interface module determines that a power consumption of the first electronic device is lower or equal to a predetermined value according to the device information of the first electronic device, and generates the second control signal to the control circuit, wherein after receiving the second control signal, the control circuit generates the first control signal to cut off the switch circuit connecting the first electronic device, so that the power consumption of the first electronic device becomes 0.

2. The power supply system of claim 1, wherein the first power conversion circuit comprises:

a pre-stage conversion circuit configured to receive the input AC voltage and configured to convert the input AC voltage into a transient voltage; and a main power circuit coupled between the pre-stage conversion circuit and the switch circuits, and configured to convert the transient voltage into the first DC voltage and transmit the first DC voltage to the switch circuits.

3. The power supply system of claim 2, wherein the main power circuit comprises a first transformer and a first rectifying and filtering circuit, the first transformer comprises a first primary winding and a first secondary winding, the first primary winding is coupled to the pre-stage conversion circuit and is configured to receive the transient voltage, the first secondary winding is configured to output a first induced voltage by an electromagnetic induction with the first primary winding, and the first rectifying and filtering circuit is coupled to the first secondary winding and is configured to rectify and filter the first induced voltage into the first DC voltage.

4. The power supply system of claim 2, wherein the pre-stage conversion circuit comprises an electromagnetic interference (EMI) filter circuit, a rectifier circuit and a boost conversion circuit, the EMI filter circuit is configured to receive the input AC voltage and filter an electromagnetic noise of the input AC voltage, the rectifier circuit is configured to perform a rectification on a voltage outputted by the EMI filter circuit, and the boost conversion circuit is configured to perform a voltage boost process on a voltage outputted by the rectifier circuit and generate the transient voltage.

5. The power supply system of claim 2, wherein the first power conversion circuit further comprises an auxiliary power circuit, the auxiliary power circuit is configured to convert the transient voltage into a third DC voltage and provide the third DC voltage to the human-machine interface module and the control circuit.

6. The power supply system of claim 5, wherein the auxiliary power circuit comprises a second transformer and a second rectifying and filtering circuit, the second transformer comprises a second primary winding and a second secondary winding, the second primary winding is coupled to the pre-stage conversion circuit and is configured to receive the transient voltage, the second secondary winding is configured to output a second induced voltage by an electromagnetic induction with the second primary winding, and the second rectifying and filtering circuit is coupled to the second secondary winding and is configured to rectify and filter the second induced voltage into the third DC voltage.

7. The power supply system of claim 1, wherein each of the electronic devices further comprises a regulator, a processing circuit and a user interface, the regulator is configured to stabilize the second DC voltage to provide the second DC voltage to the processing circuit, the communication module and the user interface.

8. The power supply system of claim 7, wherein each of the electronic devices is configured to wirelessly transmit the at least one device signal to the human-machine interface module by the communication module.

9. The power supply system of claim 7, wherein the electronic devices establish a wireless communication network between the electronic devices by the communication modules and transmit the at least one device signal of the electronic devices to the human-machine interface module.

10. The power supply system of claim 7, wherein the received information further comprises a user input.

11. The power supply system of claim 1, wherein the received information further comprises a user input.

* * * * *